July 8, 1958 K. S. VAN DYKE 2,842,687

CRYSTAL MOUNT

Filed Sept. 2, 1954 2 Sheets-Sheet 1

INVENTOR,
KARL S. VAN DYKE.
BY
Harry M. Saragovitz
ATTORNEY

July 8, 1958 K. S. VAN DYKE 2,842,687

CRYSTAL MOUNT

Filed Sept. 2, 1954 2 Sheets-Sheet 2

INVENTOR,
KARL S. VAN DYKE.

BY Harry M. Saragovitz

ATTORNEY.

United States Patent Office 2,842,687

Patented July 8, 1958

2,842,687

CRYSTAL MOUNT

Karl S. Van Dyke, Middletown, Conn., assignor to the United States of America as represented by the Secretary of the Army Application September 2, 1954, Serial No. 453,979

5 Claims. (Cl. 310—9.1)

This invention relates to piezoelectric crystals and more particularly to a piezoelectric resonator structure wherein reproducibility of the mechanical condition of the piezoelectric crystal is readily obtained upon the remounting of the crystal.

Ideally the piezoelectric resonator when used as a frequency standard or as an element in frequency control should be as completely isolated as possible from mechanical support and disturbances. Such ideal support is impossible, of course, due to the necessity of balancing the effect of gravity and also of keeping the resonator free of contact with its container. The customary methods of support are either rigid clamping (often just at the corners or edges) or rigid connection to a few wires which serve to support as well as to supply current to the crystal.

Such mechanical contacts with the crystal, even when they are soldered and firm, inherently modify the vibrating system so that the resonance of the resonator is affected to include to a more or less minor extent the elastic, inertial, and dissipative properties of the supporting mechanism. For example, the amount of modification of the crystal resonance which is introduced becomes a troublesome variation if the supports are not rigidly connected to the crystal and if the properties of the support vary with temperature, pressure, mechanical shock, etc. The variation of the effect of supports on the resonance characteristics is particularly troublesome when it becomes necessary to remount the crystal. In such a situation, reproducibility of the mechanical condition of the resonator is almost impossible to attain.

It is, accordingly, a primary object of the present invention to provide a piezoelectric structure wherein the mechanical condition of the piezoelectric crystal is substantially reproduced upon the remounting of the crystal.

It is a further object to provide a piezoelectric structure wherein the frequency may be controllably varied over a limited range.

In accordance with the present invention, there is provided a piezoelecrtic unit comprising a container, a piezoelectric crystal therein, and a hairlike structure packed around said crystal and filling the remainder of said container.

Also in accordance with the present invention, there is provided a piezoelectric unit comprising a container, a piezoelectric crystal therein, a hairlike material packed around said crystal and filling said container, said material making a plurality of contacts with said crystal, the frequency of said crystal being variable with the degree of closeness of packing of said material.

For a better understanding of the invention together with other and further objects thereof, reference is had to the following description taken in connection with the accompanying drawings and its scope will be pointed out in the appended claims.

In the drawing, Fig. 1 is a sectional view of preferred embodiment of the invention;

Figure 1:
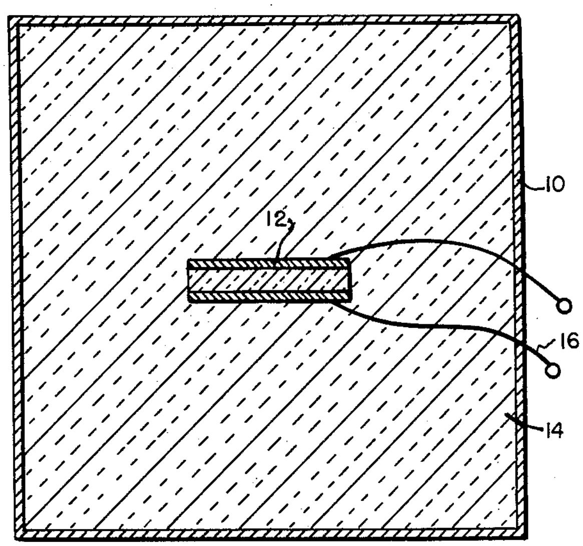

Referring now more particularly to Fig. 1 there is shown a container 10, consisting of a suitable rigid material such as metal or the like, wherein a piezoelectric crystal resonator 12 is confined. The geometric configuration of container 10 is not critical. Crystal resonator 12 may be a quartz or other type piezoelectric crystal having metallized electrode surfaces and in the present embodiment is of square configuration. The space in container 10 above, below and around the sides of crystal 12 is filled with a loosely packed material 14 which may be glass wool, velvet cloth, hairfelt, or other like material. Lead wires 16 are shown soldered to the metallized electrode surfaces of crystal 12 as shown.

The present invention in essence substitutes for the few mechanical supports conventionally found in a resonator, a plurality of supporting contacts. The piezoelectric crystal is in effect packed in the blanket of hairlike matrial with the crystal being contacted by the blanket material in random locations. The statistical effect of these many contacts is to enable a very delicate and easily adjustable degree of modification of the resonance properties of the crystal.

Figure 2:
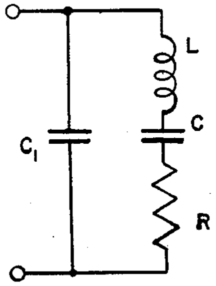
Fig. 2 is a schematic depiction of the electric network equivalent of a piezoelectric resonator.

Prior to discussing the efficacy of the present invention, it is necessary to review how equivalent network parameters of a piezoelectric crystal are determined. The motional capacitance, C of Fig. 2, is measured in a twin-T measuring circuit or in a radio frequency bridge such as the General Radio Frequency Bridge 916–A . It is to be noted that if this measurement comes out to be a strictly linear function of the frequency, it is to be concluded that within the frequency range measured, there are no traces of secondary modes. The bridges measure simultaneously the dissipative characteristic of the crystal and thus its Q. The Q of the mounted crystal is likewise found to vary with the closeness of the packing of the glasswool and to be controllable through the packing.

Figure 3:
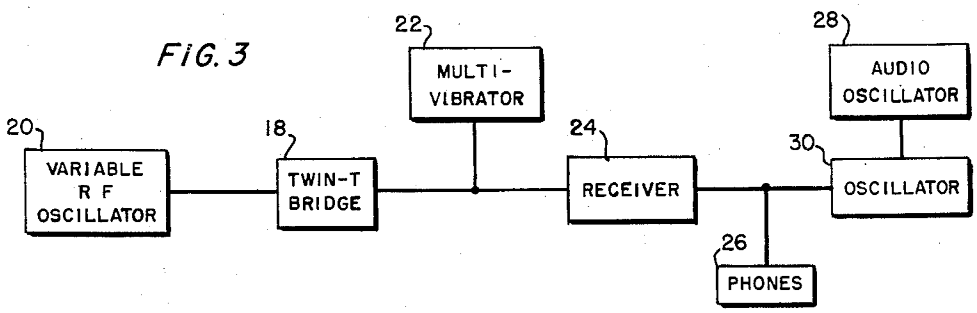
Fig. 3 is a system for measuring crystals.

To measure the motional capacitance and the Q, the admittance of the crystal is measured at different frequencies, near the resonant frequency. The crystal is measured in the twin-T bridge 18 (Fig. 3) with a radio frequency oscillator 20 as a generator. The output of bridge 18 is mixed with a signal from a 10 kc. multivibrator 22 and connected to a receiver 24 and the audio signal in the earphones 26 determines the condition of balance. After the crystal frequency is determined, the frequencies at which measurements are to be taken is decided upon. Receiver 24 is, then, set to pass the nearest 10 kc. harmonic, the audio oscillator 28 is set to the beat frequency, and variable R. F. oscillator 20 is adjusted until the Lissajous circle appears on the oscilloscope 30. An initial balance is then made with the twin-T bridge 18, crystal 12 mounted within container 10 is inserted into the twin-T bridge 18 and a final balance is made. This process is repeated for different frequencies, and the equivalent circuit constants of the crystal are computed from the set of readings obtained. If the frequency of the crystal is not known, it may first be determined by various well known methods. For example, the crystal may be oscillated in a crystal test set, its frequency being picked up in receiver 24 while variable R. F. oscillator 20 is tuned for zero beat with this frequency.

The method of calculating the motional capacitance is based on the approximation that the reactance of the series branch of the equivalent network as shown in Fig. 2 varies linearly with frequency in the vicinity of resonance. The reactance of the series branch is due only to the inductance and the capacitance of that branch and is equal to $$X=\omega L-\frac{1}{\omega C} \qquad (1)$$

If this reactance is plotted as a function of frequency, the slope of the curve at series resonance will be $$\left.\frac{dX}{d\omega}=L+\frac{1}{\omega^2 C}\frac{dX}{d\omega}\right]_{\omega=\omega_0}=\frac{1}{\omega^2 C}+\frac{1}{\omega^2 C}=\frac{2}{\omega^2 C} \qquad (2)$$

The twin-T bridge measures the conductance and susceptance of the entire crystal. If the parallel capacitance, $C_1$ of Fig. 2 is known, its susceptance $B_1$ can be subtracted from the total susceptance measured, $B_e$, and therefore the reactance of the series branch of Fig. 2 is equal to $$X=\frac{-(B_e-B_1)}{(B_e-B_1)^2+G^2}=-\frac{1}{B_e-B_1} \qquad (3)$$

where G is 1/B (resistance in the series arm of Fig. 2). An approximation of $G<<B_e-B_1$ is justified for most high Q crystals except for a narrow region close to series resonance. If $C_1$ is not previously known, it may be determined as the value which used in susceptance form as $B_1$ in Eq. 3 converts a smooth curve of measured values for the entire crystal unit into the desired linear relation which is characteristic of the series branch (Fig. 2).

The twin-T bridge does not measure susceptance directly, but measures it in terms of an equivalent capacitance, where $B=\omega C$. Equation 3 is therefore multiplied through by $\omega$ resulting in $$\omega X=-\frac{1}{C_e-C_1} \qquad (4)$$

This is plotted against frequency, and the slope measured at series resonance. Combining Equations 2 and 4, it is seen that the slope is equal to $$m=\left[\frac{d}{df}-\left(\frac{1}{C_e-C_1}\right)\right]_{f=f_0}=\frac{2}{fC} \qquad (5)$$

Solving for the motional capacitance $$C=\frac{2}{mf} \qquad (6)$$

The value of Q is found from the defining relation $$Q=\frac{1}{\omega_0 CR}$$

where R is the measured value of the resistance of the series branch of Fig. 2.

To show the efficacy of the present invention, the equivalent circuit parameters of an AT cut crystal plate 43.8 x 43.8 x 3.15 mm. (thickness shear-fundamental mode) packed in glass wool within container 10 was measured for motional capacitance as defined above in the twin-T bridge and then in the radio frequency bridge. Both gave straight lines for $$\frac{1}{B_e-B_1}$$

plotted against frequency. It is to be noted, as explained hereinbelow, that the twin-T bridge provides points rather farther out from the resonance frequency than does the radio frequency bridge. The falling of the plotted points for both bridges on the same straight line would be proof that both bridges make identical judgments as to the parameters of the equivalent network of the crystal. The slope of the straight line is a measure of motional capacitance.

Figure 4:
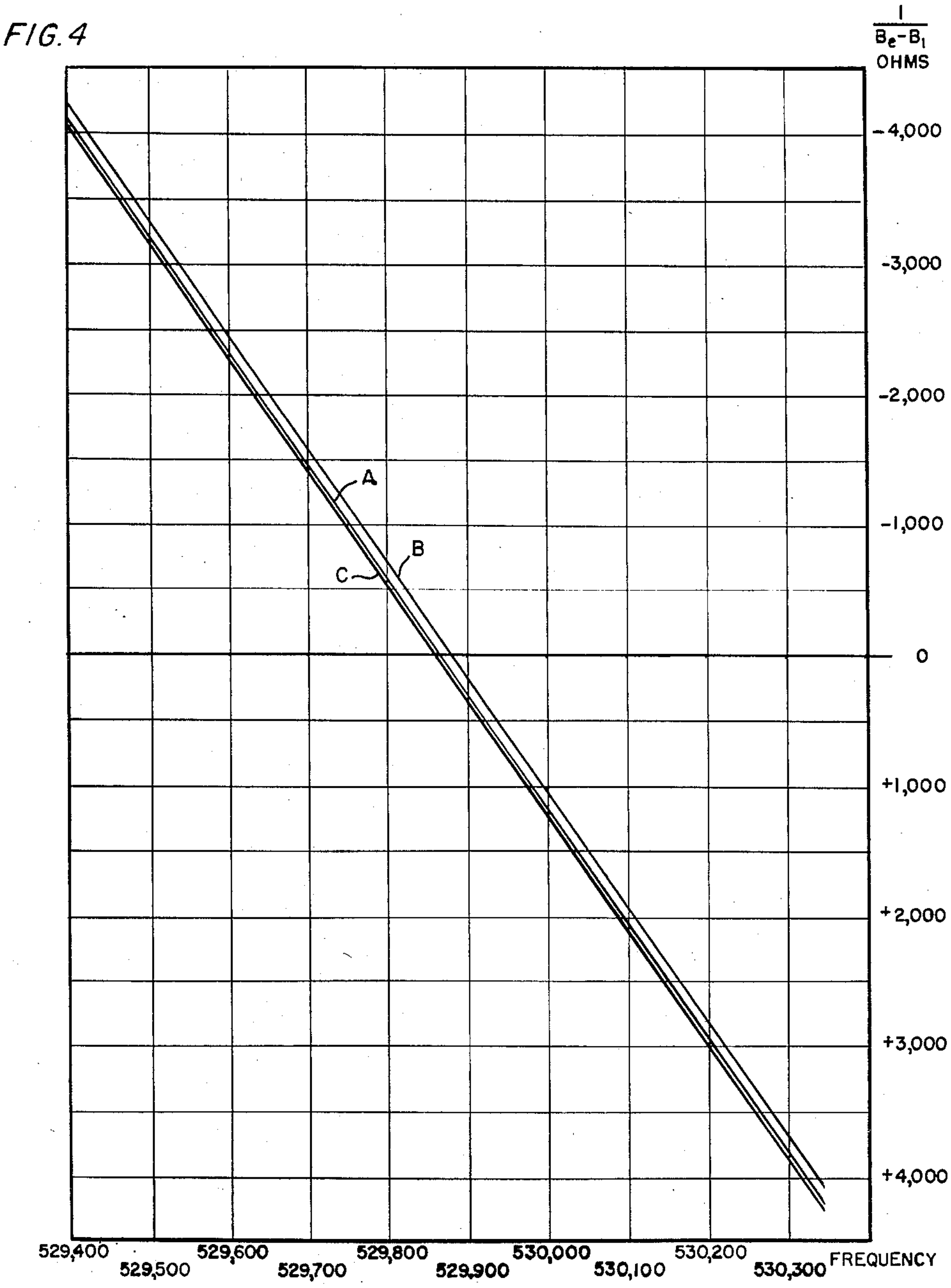
Fig. 4 is a graph of data illustrating the efficacy of the present invention.

It was found in plotting the lines A and B of Fig. 4 that when the crystal was transferred from one glass wool packing to another in the shift from the radio bridge to the twin-T bridge, the degree of fluffing of the glass wool in the two mountings proved to be different. The two bridges showed no significant difference in their measurements of motional capacitance (slope of lines A and B) but the lines were slightly shifted so as to cross the frequency axis (zero reactance) at different frequencies. The shift in frequency was about 11 cycles per second in about 530,000. Repacking by further fluffing up the glass wool in container 10 brought the resonance frequencies with the twin-T bridge into much closer agreement with that of the radio frequency bridge and the mounting there used as shown on line C of Fig. 4.

In summary, the present invention teaches a device wherein a piezoelectric crystal may be placed in a mounting and then replaced in the mounting and the crystal's equivalent circuit parameters will be closely duplicated. With this device, the resonance frequency may be varied by slight amounts while the value of the motional capacitance may be kept substantially unchanged. In addition, it is noted that there is achieved a change in the Q of the crystal by change in the closeness of the packing.

A possible mechanism for the change in frequency under the altered restraint of the glass wool packing is submitted. It is well known that in the process of shearing, if the shearing is pictured as a sliding of the top surface of the crystal plate with respect to the bottom, the conservation of angular momentum requires that the crystal rock as a whole in the opposite rotational sense. The effect of the glass wool or other clothlike material is elastically to restrain gently and delicately this second rotational oscillation while merely slightly frictionally clamping the first rotation. The elastic restraint raises the resonance frequency. Thus, by the use of the hairlike packing in the mounting, a means of delicate preferential elastic restraint on one of the component motions of the crystal, its rocking motion, is provided.

The present invention's teaching is advantageously applicable to crystals which are kept in fixed locations and to crystals which serve in portable standards of communication equipment. The crystals may be resonators, frequency reference devices, or crystals which are incorporated in oscillator circuits so as to control their frequency.

While there have been described what are, at present, considered to be the perferred embodiments of the present invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A resonant unit comprising a container, a piezoelectric device in said container comprising a piezoelectric crystal having electrodes thereon, and a hairlike material loosely packed around and contacting said piezoelectric device on all sides and filling said container, said material making a plurality of random contacts with said piezoelectric device and providing the sole support therefor, the frequency of said device and its Q being variable with variation of the closeness of packing of said material.

2. A unit as defined in claim 1 wherein said material is glass wool.

3. A unit as defined in claim 1 wherein said material is velvet.

4. A unit as defined in claim 1 wherein said material is hairfelt.

5. A unit as defined in claim 1 wherein said crystal is quartz.

References Cited in the file of this patent

UNITED STATES PATENTS

| | | |
|---|---|---|
| 1,813,461 | Nicolson | July 7, 1931 |
| 1,851,208 | Nicholson | Mar. 29, 1932 |
| 1,864,615 | Quinby | June 28, 1932 |
| 2,000,523 | Knapp | May 7, 1935 |
| 2,203,322 | Bruzaw et al. | June 4, 1940 |
| 2,512,641 | Halstead | June 27, 1950 |
| 2,538,184 | Anderson | Jan. 16, 1951 |